(12) United States Patent
Gretz

(10) Patent No.: US 9,941,679 B1
(45) Date of Patent: Apr. 10, 2018

(54) INTERLOCKING FLOOR BOX WITH EXTENDED LOCKING CONDUIT HUBS

(71) Applicant: Arlington Industries, Inc., Scranton, PA (US)

(72) Inventor: Thomas J. Gretz, Delray Beach, FL (US)

(73) Assignee: ARLINGTON INDUSTRIES, INC., Scranton, PA (US)

( * ) Notice: Subject to any disclaimer, the term of this patent is extended or adjusted under 35 U.S.C. 154(b) by 0 days.

(21) Appl. No.: 15/613,758

(22) Filed: Jun. 5, 2017

Related U.S. Application Data

(60) Provisional application No. 62/346,060, filed on Jun. 6, 2016, provisional application No. 62/398,796, filed on Sep. 23, 2016.

(51) Int. Cl.
*H02G 3/18* (2006.01)
*H02G 3/14* (2006.01)

(52) U.S. Cl.
CPC .............. *H02G 3/185* (2013.01); *H02G 3/14* (2013.01)

(58) Field of Classification Search
CPC ................................ H02G 3/14; H02G 3/185
USPC ........................................................ 174/58
See application file for complete search history.

(56) References Cited

U.S. PATENT DOCUMENTS

| | | | |
|---|---|---|---|
| 3,288,910 A * | 11/1966 | Zerwes | H01R 13/447 174/53 |
| 4,620,061 A * | 10/1986 | Appleton | H02G 3/14 174/51 |
| 5,272,278 A | 12/1993 | Wuertz | |
| 5,466,886 A * | 11/1995 | Lengyel | H02G 3/185 174/487 |
| 5,468,908 A | 11/1995 | Arthur et al. | |
| 5,534,664 A * | 7/1996 | Fearing, Jr. | F21V 19/04 174/50 |
| 5,679,924 A * | 10/1997 | Young | H02G 3/14 174/50 |
| 5,783,774 A | 7/1998 | Bowman et al. | |
| 5,994,976 A * | 11/1999 | Tang | H01R 9/0506 174/50 |
| 6,179,634 B1 | 1/2001 | Hull et al. | |
| 6,527,302 B1 * | 3/2003 | Gault | F16L 41/03 174/50 |
| 7,795,544 B2 | 9/2010 | Peck | |
| 7,939,767 B2 * | 5/2011 | Tiefenthaler | H02G 3/22 174/24 |
| 8,273,998 B2 | 9/2012 | Drane | |

(Continued)

*Primary Examiner* — Dhirubhai R Patel

(57) ABSTRACT

An interlocking floor box assembly including one or more electrical boxes which may be securely ganged together to form a multi-gang floor box for mounting one or more electrical components, such as duplex outlets, directly in a concrete pour area or in a floor above a concrete base. Opposing side walls include an internal hub and an external hub respectively for interlocking two or more electrical boxes together. Other embodiments may include a tab and a corresponding slot on opposing walls on the electrical boxes to enable interlocking two or more boxes. The interlocking floor box assembly enables secure side to side interlocking of two or more boxes to form a multi-gang floor box. A cover plate and a lid assembly enable plug in of electrical cords into the duplex outlets with the plug ends of the cords recessed below the floor level.

7 Claims, 19 Drawing Sheets

(56) References Cited

U.S. PATENT DOCUMENTS

| | | | |
|---|---|---|---|
| 8,378,232 B2 * | 2/2013 | Drane | H02G 3/185 |
| | | | 174/482 |
| 8,759,676 B1 | 6/2014 | Gretz | |
| 8,921,712 B1 | 12/2014 | Gretz | |
| 9,667,049 B1 | 5/2017 | Gretz | |

* cited by examiner

9,941,679 B1

INTERLOCKING FLOOR BOX WITH EXTENDED LOCKING CONDUIT HUBS

CROSS-REFERENCE TO RELATED APPLICATIONS

This application claims the benefit of provisional U.S. Patent Application Ser. No. 62/346,060 filed Jun. 6, 2016 and benefit of provisional U.S. Patent Application Ser. No. 62/398,796 filed Sep. 23, 2016, the contents of which are herein incorporated by reference in their entirety.

FIELD OF THE INVENTION

This invention relates to devices for enclosing electrical outlets and more specifically to an interlocking floor box assembly for mounting one or more electrical outlets in a floor.

BACKGROUND

For providing the convenience of one or more electrical outlets in close location to an electrical appliance, it is a common desire in homes, apartment buildings, offices, and the like to provide electrical outlets in the floor. In modern construction, floors are oftentimes constructed of concrete, such as in basements or slabs in multi-floor structures. Typically one or more electrical boxes are placed within the forms that will receive the concrete pour, the concrete is poured around the electrical boxes, and, after the concrete cures, an electrical component is mounted within each of the boxes. In many cases, multi-gang boxes are used in a concrete pour to mount two or more outlets in close proximity to one another.

Concrete is substantially heavy and, when poured, exerts substantial pressure on the electrical boxes within the pour area. When installing multi-gang boxes, it is therefore important that any interconnected boxes are locked tightly together to maintain connection and alignment of the multi-gang box. Although various multi-gang electrical boxes have been proposed for mounting electrical components within a concrete pour area, the interlocking mechanism on conventional floor boxes does not hold the interconnected boxes securely together during the concrete pour and oftentimes leads to misalignment or separation of the boxes during the concrete pour operation.

Accordingly, what is needed is an interlocking electrical floor box for concrete pours that enables secure interlocking of adjacent boxes to form a multi-gang floor box. Furthermore, the multi-gang box should enable electrical cords to remain plugged into components in the multi-gang box while simultaneously enabling a lid to cover the multi-ganged box. Reading of the following description with reference to the included drawings will make clear these and other advantages provided by the electrical box assembly of the present invention.

BRIEF SUMMARY OF THE INVENTION

The current invention is an interlocking floor box assembly in which several electrical boxes may be securely ganged together to form a multi-gang floor box assembly for mounting one or more electrical components, such as duplex outlets, in a floor above a concrete base. Opposing side walls an electrical box portion of the interlocking floor box may include a tab and corresponding slot respectively for locking two boxes together at an upper end. Opposing side walls may further include an internal hub and an external hub respectively for interlocking the boxes together at a lower end. The interlocking mechanisms enable secure side to side interlocking of two or more boxes to form a multi-gang floor box. A cover plate and a lid assembly enable plug in of electrical cords into the duplex receptacles with the plug ends of the cords recessed below the floor level. The electrical boxes may be cut to fit the height of any finished flooring installed above the concrete base.

OBJECTS AND ADVANTAGES

A first object of the current invention is to provide an interlocking floor box that enables secure interlocking of a series of single-gang boxes to form a multi-gang electrical box.

A second object of the invention is to provide an interlocking floor box with a mechanism for locking two or more boxes together at both the top and lower ends of the boxes.

A further object of the invention is to provide an interlocking floor box that provides a recess for accommodating the plug ends of electrical cords, thereby reducing the possibility of the plug ends being contacted, stumbled over, or mistakenly knocked out of their respective electrical outlets.

Another object of the invention is to provide an interlocking floor box that enables an installer to rapidly and securely join one or more single-gang boxes to form a multi-gang electrical box.

A further object is to provide an interlocking floor box assembly that enables an installer to cut the walls of the electrical box portion of the assembly to fit to the height of the finished flooring.

BRIEF DESCRIPTION OF THE SEVERAL VIEWS OF THE DRAWING(S)

Reference is made herein to the accompanying drawings, which are not necessarily drawn to scale, and wherein.

DETAILED DESCRIPTION

Figure 1:
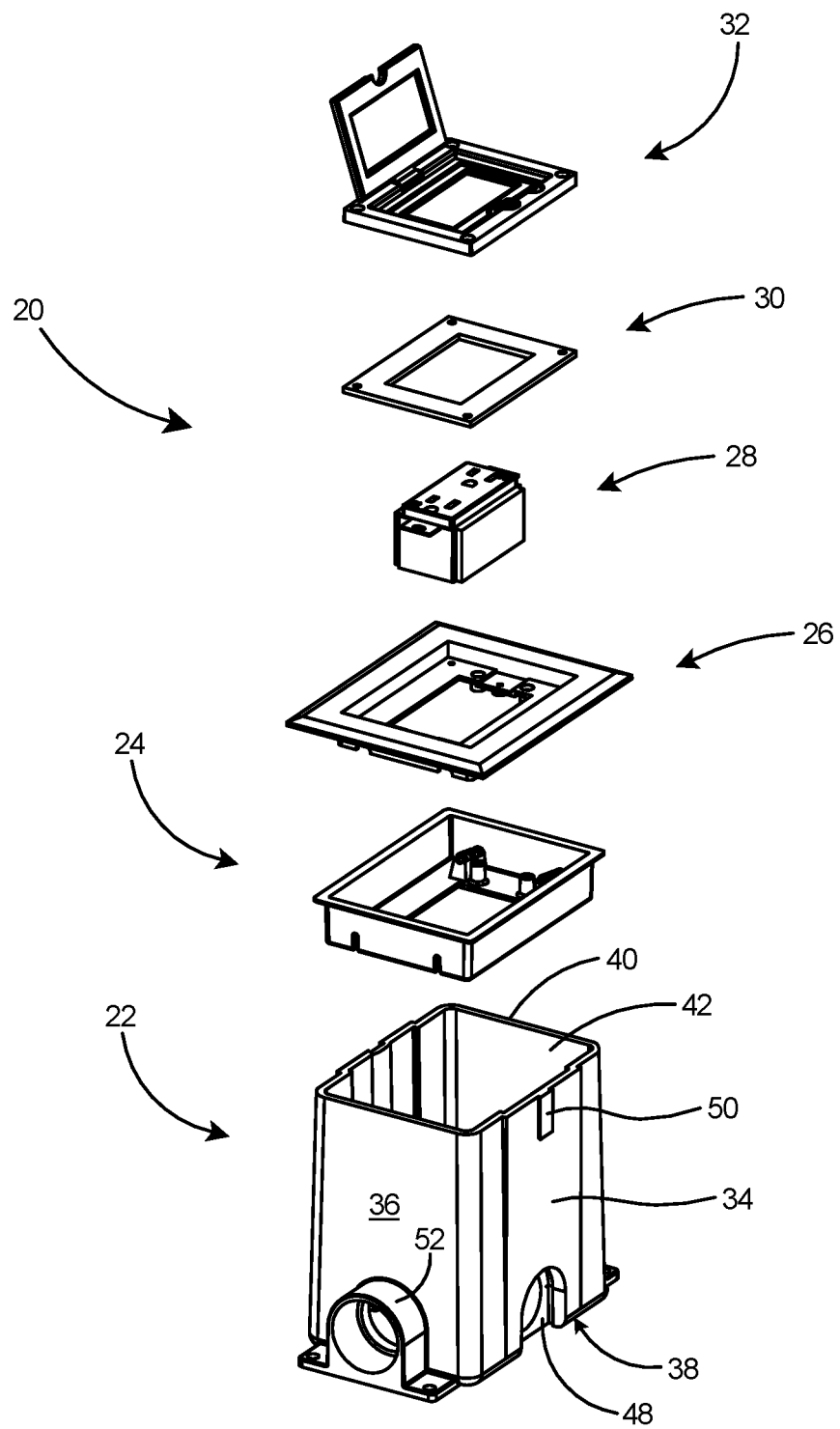
FIG. 1 is an exploded isometric view of a first embodiment of an interlocking floor box assembly in accordance with embodiments of the invention.

Referring to FIG. 1, in accordance with the present invention, there is shown a first embodiment of an interlocking floor box 20 including an electrical box 22, a cover plate adapter 24, a cover plate 26, a duplex receptacle 28, an optional gasket 30, and a lid assembly 32.

Figure 2:
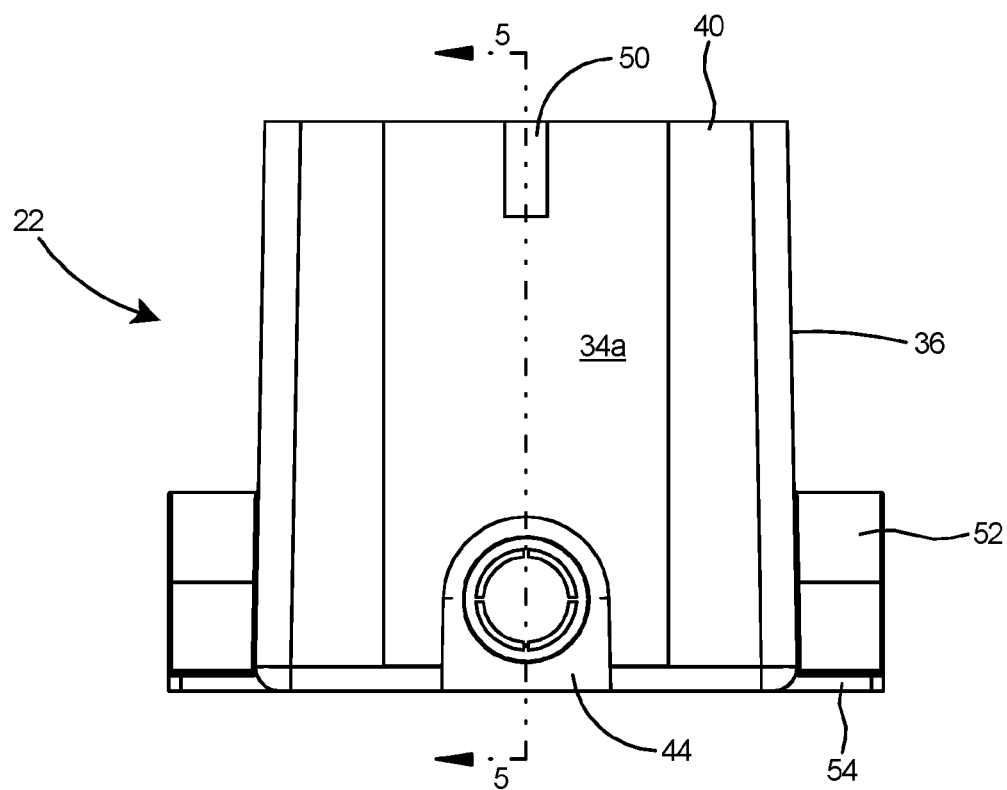
FIG. 2 is a side view of an electrical box that forms a portion of the interlocking floor box of FIG. 1.
Figure 3:
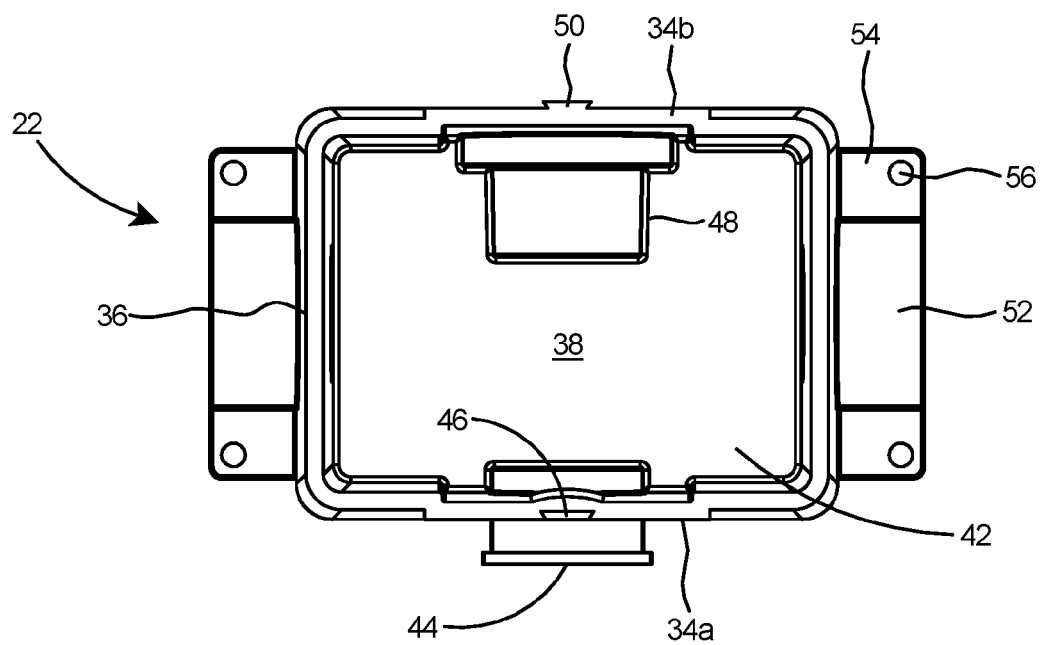
FIG. 3 is a top view of the electrical box.

With reference to FIGS. 2 and 3, the electrical box 22 is preferably molded in one-piece and includes two side walls 34 and two end walls 36. The electrical box 22 includes a closed bottom with a bottom wall 38 and an open top 40. Side walls 34, end walls 36, and bottom wall 38 together form an enclosure 42 for accepting an electrical component and wiring therein.

Referring to FIGS. 2 and 3, a first side wall 34a of electrical box 22 includes a male hub 44 extending outward near the bottom of the side wall and a slot 46 at the top of the side wall. A female hub 48 is included near the bottom of the second side wall 34b and a tab 50 extends from the top of the side wall. End hubs 52 extend from each end wall 36. Each side of the end hubs 52 may include a skirt 54 extending therefrom. Skirt 54 may include one or more apertures 56 therein.

Figure 4:
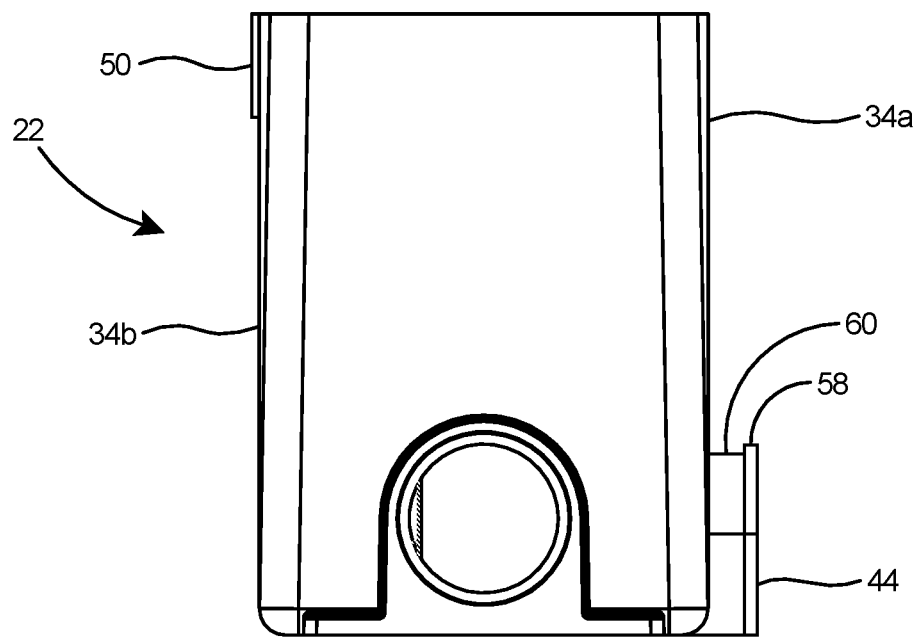
FIG. 4 is an end view of the electrical box.
Figure 5:
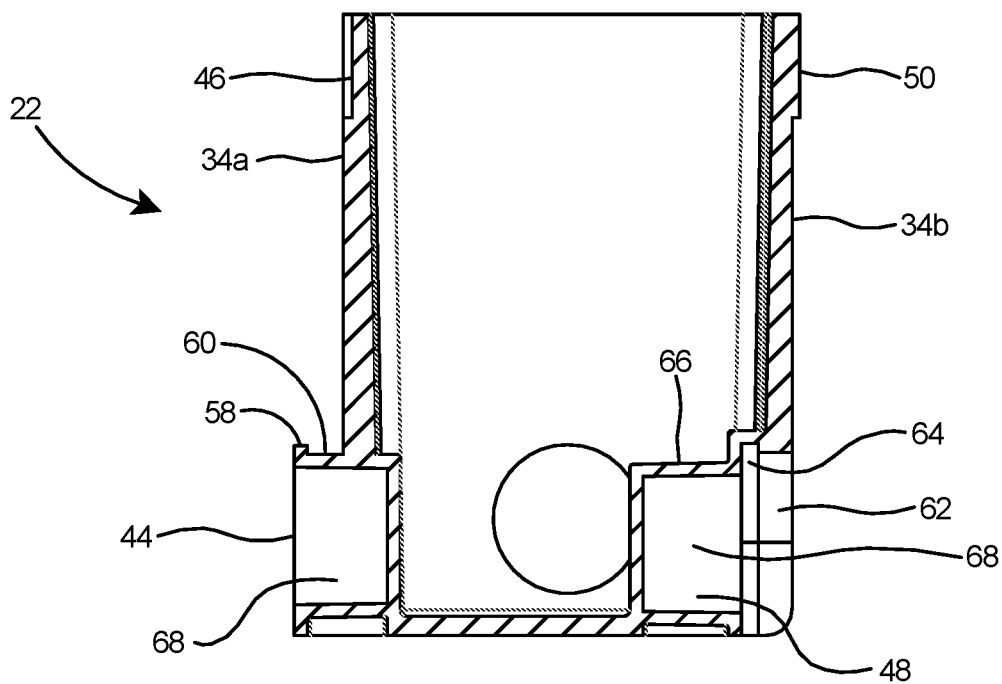
FIG. 5 is a sectional view of the electrical box taken along line 5-5 of FIG. 2.

As shown in FIGS. 4 and 5, a flange 58 is provided on the upper periphery 60 of the male hub 44 on the first side wall 34a. As shown in FIG. 5, a conduit entry 62 is provided in the second side wall 34b leading into the female hub 48. Conduit entry 62 leads to a slot 64 that is formed around the upper periphery 66 of the female hub 48. Each male hub 44 and female hub 48 includes a socket 68 therein for accepting insertion of an electrical conduit (not shown) for feeding electrical wiring into the electrical box 22.

Figure 2A:
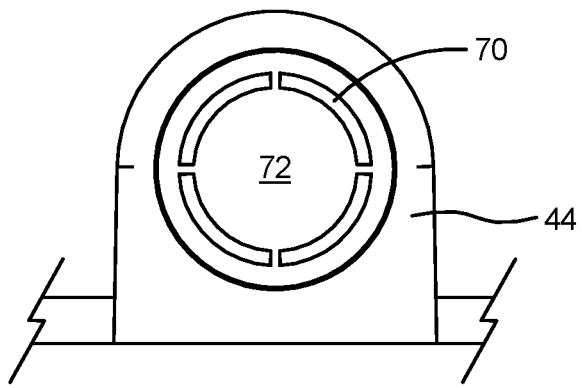
FIG. 2A is a detail view of an electrical box hub according to the present invention.

With reference to FIG. 2A, one or more of the hubs 52, 44, and 48 may include an inner wall 70 with a breakaway wall portion 72. As the interlocking floor box is used in concrete pours, the breakaway wall portion in each hub can be removed by the installer as required to meet the installation requirements of the box, such as for providing a conduit opening between interlocked boxes as described herein below. For any conduit hub that will not be connected to an electrical conduit, the breakaway wall portion may be left intact to prevent concrete from entering the box at the hub.

Figure 7:
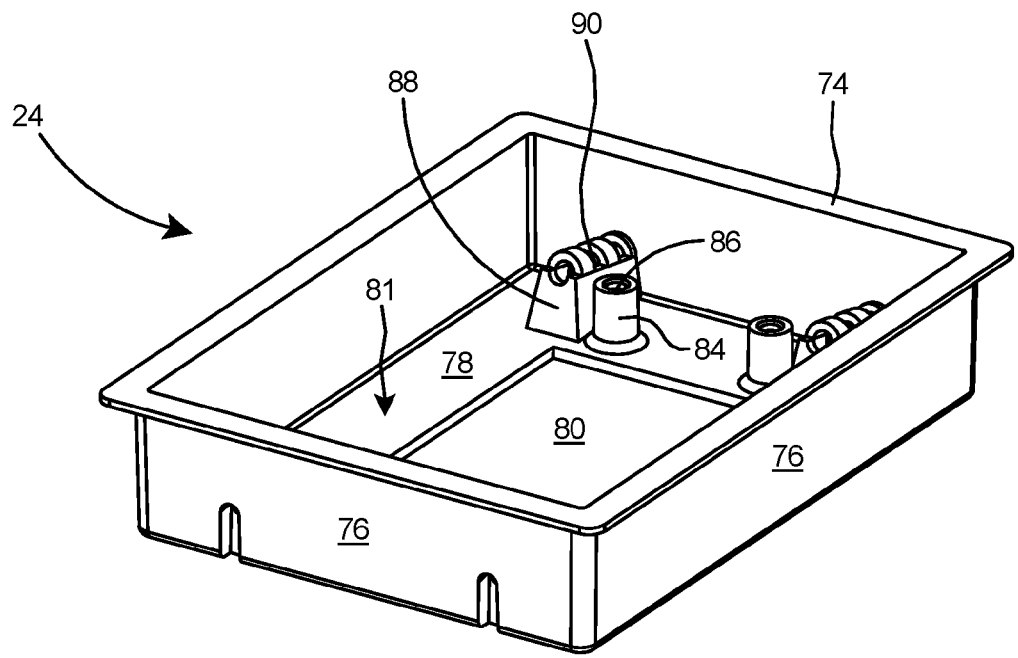
FIG. 7 is an isometric view of the cover plate adapter that forms a portion of the interlocking floor box of FIG. 1.

Referring to FIG. 7, a cover plate adapter 24 according to the invention includes a frame 74, four sidewalls 76, and a peripheral wall 78 extending from the sidewalls, an opening 80 and a face 81 surrounding the opening. One or more bosses extend from the back wall. The cover plate adapter 24 includes one or more first bosses 84 with bores 86 therein extending from the face 81 of the peripheral wall 78 and one or more second bosses 88 with bores 90 therein.

Figure 8:
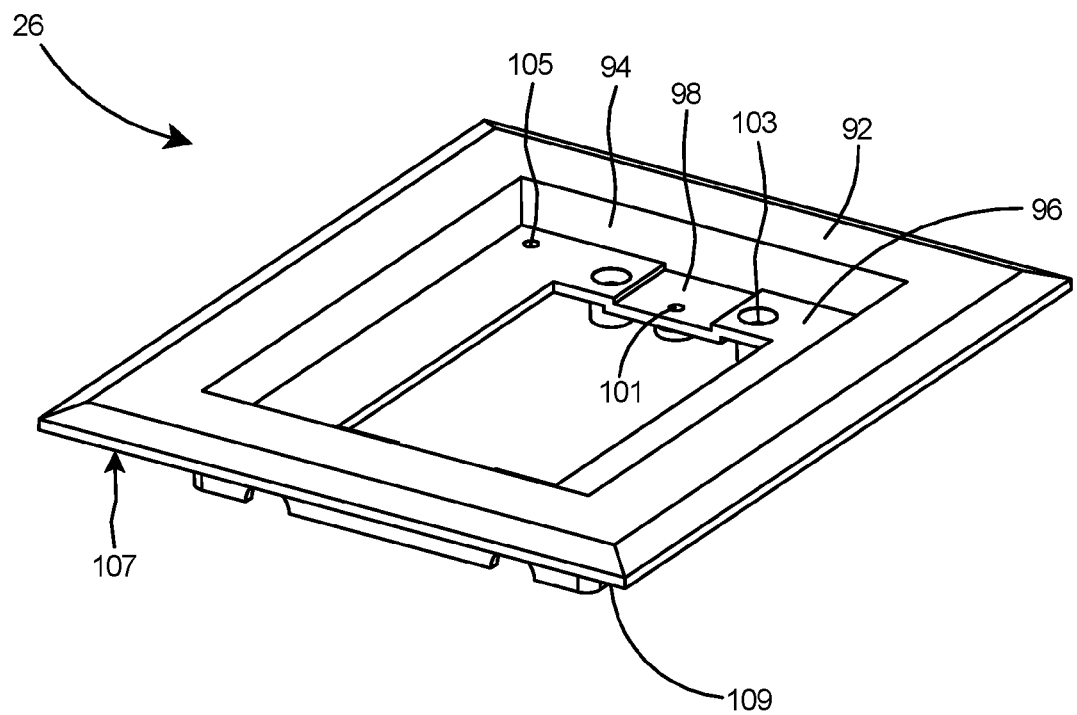
FIG. 8 is an isometric view of the cover plate that forms a portion of the interlocking floor box of FIG. 1.

With reference to FIG. 8, the cover plate 26 includes a face plate 92, a peripheral wall 94 extending from the face plate, and a component mounting surface 96. A recessed area 98 includes an aperture 101 therein for accommodating an electrical component (not shown). The faceplate 92 further includes box mounting apertures 103 and lid mounting apertures 105 for the mounting respectively of the cover plate 26 to the cover plate adapter 24 and of the lid assembly 32 to the cover plate 26 as shown in FIG. 1. Face plate 92 includes a rear surface 107 with a flat outer periphery 109 for mating with frame 74 (see FIG. 7) of cover plate adapter.

Figure 9:
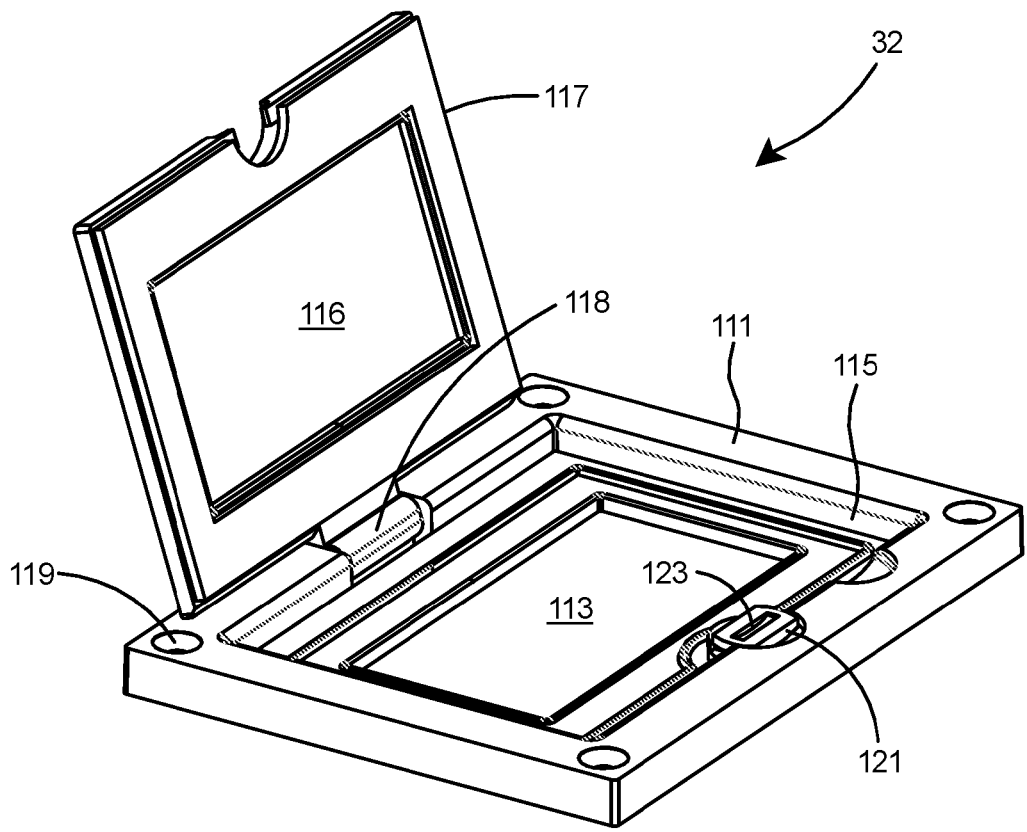
FIG. 9 is an isometric view of the lid assembly that forms a portion of the interlocking floor box of FIG. 1.

Referring to FIG. 9, lid assembly 32 includes a mounting frame 111 with an opening 113 therein and a recessed area 115 surrounding the opening. A lid 117, including an opening 116, is hinged to the lid assembly by hinge 118 and may be closed within the recessed area 115 to form a closed lid that is flush with the floor surface (not shown). Mounting frame 111 includes peripheral apertures 119 therein for effecting mounting of the lid to the cover plate 26 (see FIG. 1). The lid includes a rotatable lock 121 with a slot 123 therein for locking of lid to lid assembly.

Figure 10:
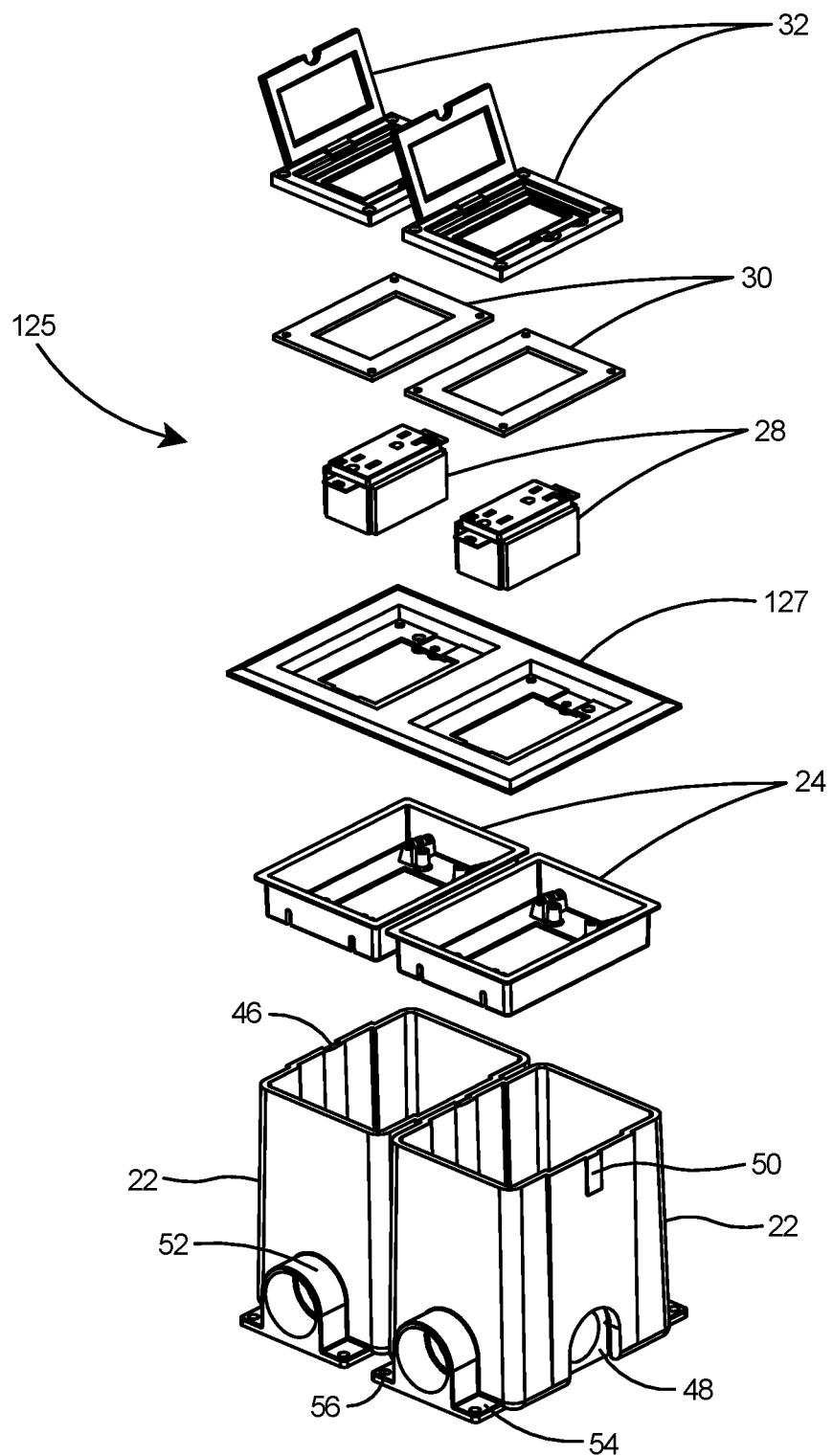
FIG. 10 is an exploded isometric view of two electrical boxes ganged together to form an interlocking floor box assembly in accordance with embodiments of the invention.

With reference to FIG. 10, the interlocking floor box of the present invention facilitates the ganging together of two or more floor box assemblies to create a two-gang interlocked box, a three-gang interlocked box, etc., per the user's requirements. FIG. 10 illustrates the ganging of two interlocking floor boxes to form a two-gang box.

Figure 11:
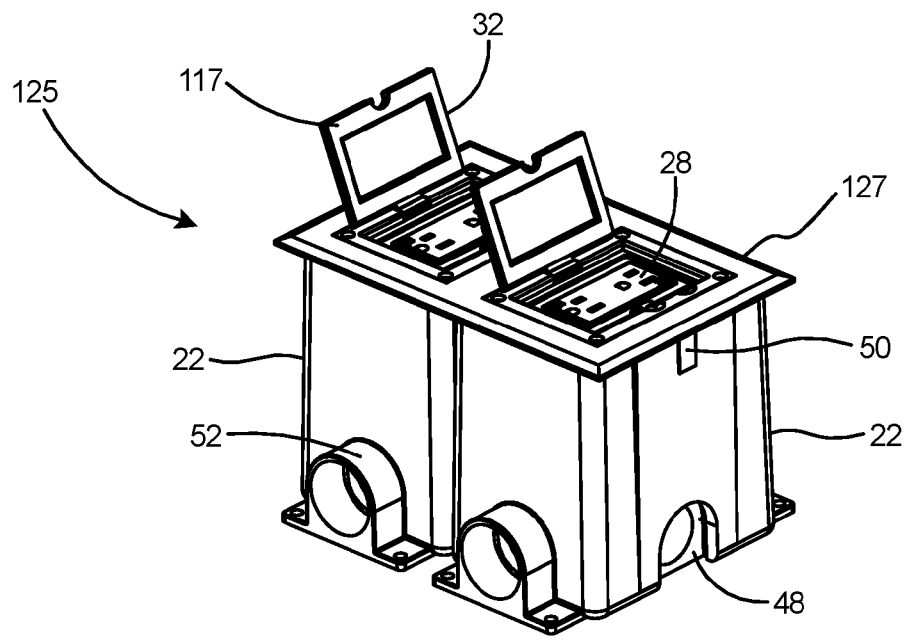
FIG. 11 is an isometric view of an assembled two-gang floor box in accordance with embodiments of the invention.
Figure 12:
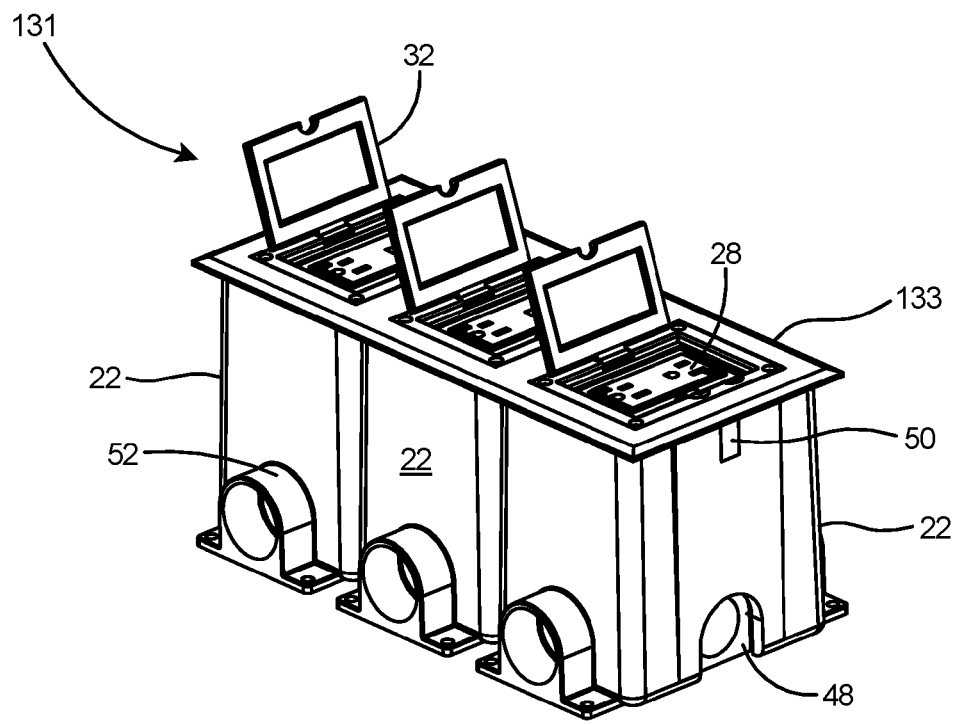
FIG. 12 is an isometric view of an assembled three-gang floor box in accordance with embodiments of the invention.

FIGS. 11 and 12 illustrate a two-gang box and a three-gang box according to the present invention. Each electrical box 22 in the respective ganged assembly includes its own respective lid assembly 32 and closeable lid 117. Although duplex receptacles 28 are shown installed in each of the electrical boxes 22, it is within the scope of the invention that other electrical components, such as switches, timers, photocells, relays, USB ports and other low voltage receptacles could also be mounted therein.

Figure 2B:
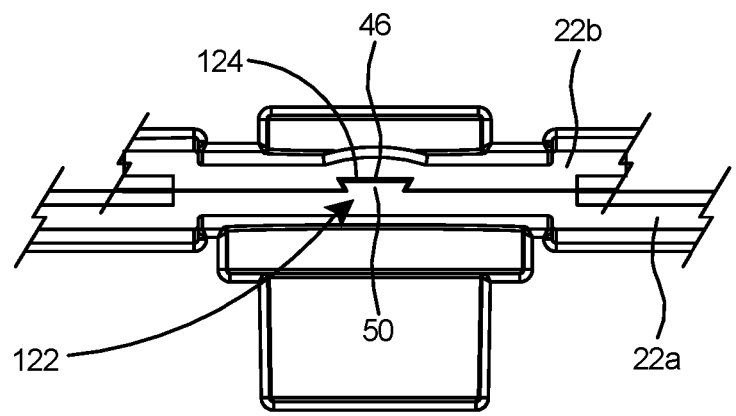
FIG. 2B is a detail view of the top of two electrical boxes joined together according to the present invention.

As shown in FIG. 2B, is a detail view of the top of two electrical boxes joined together according to the present invention. When joined together, the tab 50 on a first box 22a is dovetailed into the slot 46 of a second box 22b. The slot 46 and the tab 50 provide a second interlocking means for interlocking two or more electrical boxes, the second interlocking means 122 including a dovetail joint 124 as shown in FIG. 2B.

Figure 6:
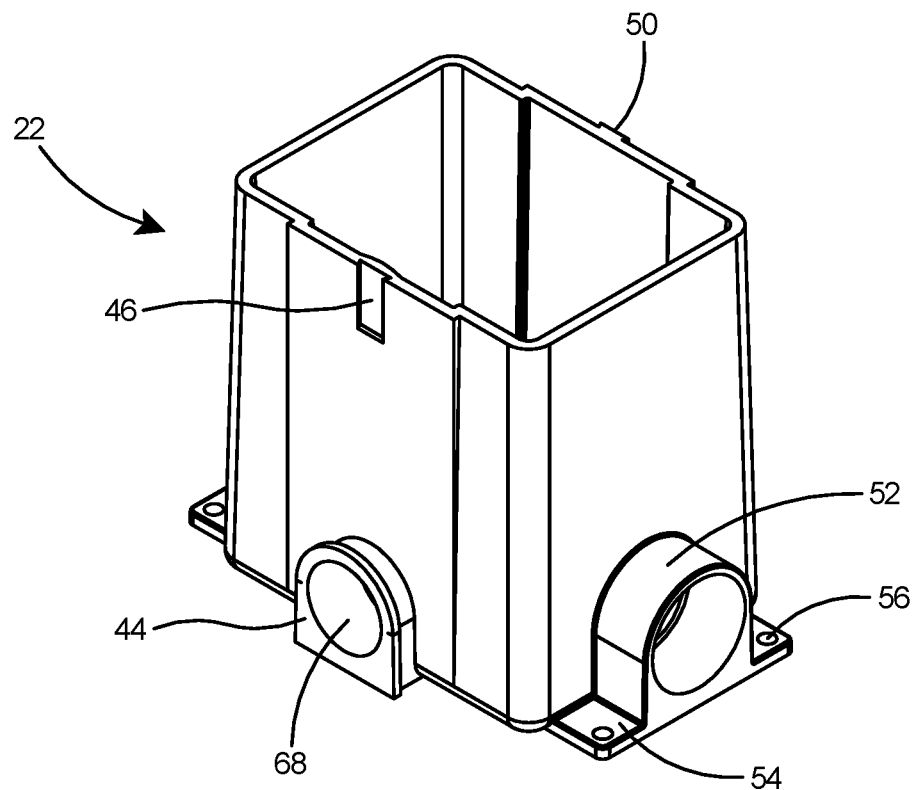
FIG. 6 is an isometric view of the electrical box.

Referring to FIGS. 4-5, a first side wall 34a of electrical box 22 includes a male hub 44 extending outward near the bottom of the side wall and a slot 46 at the top of the side wall. A female hub 48 is included near the bottom of the second side wall 34b and a tab 50 extends from the top of the side wall. As shown in FIG. 6, end hubs 52 extend from each end wall 36. Each side of the end hubs 52 may include a skirt 54 extending therefrom. Skirt 54 may include one or more apertures 56 therein.

With reference to FIG. 10, there is shown a two-gang interlocking floor box assembly 125 in accordance with embodiments of the invention to mount two electrical components side-by-side. The two-gang floor box is constructed using two electrical boxes 22, two cover plate adapters 24, two electrical components 28, two optional gaskets 30, and two lid assemblies 32. A two-gang cover plate 127 mounts to the two-ganged electrical boxes 22 and their cover plate adapters 24.

Referring to FIG. 11, the two-gang interlocking floor box assembly 125 is shown fully assembled, including the two-gang cover plate 127. FIG. 12 illustrates a three-gang interlocking floor box assembly 131 including a three-gang cover plate 133 to mount three electrical components side-by-side.

Figure 13:
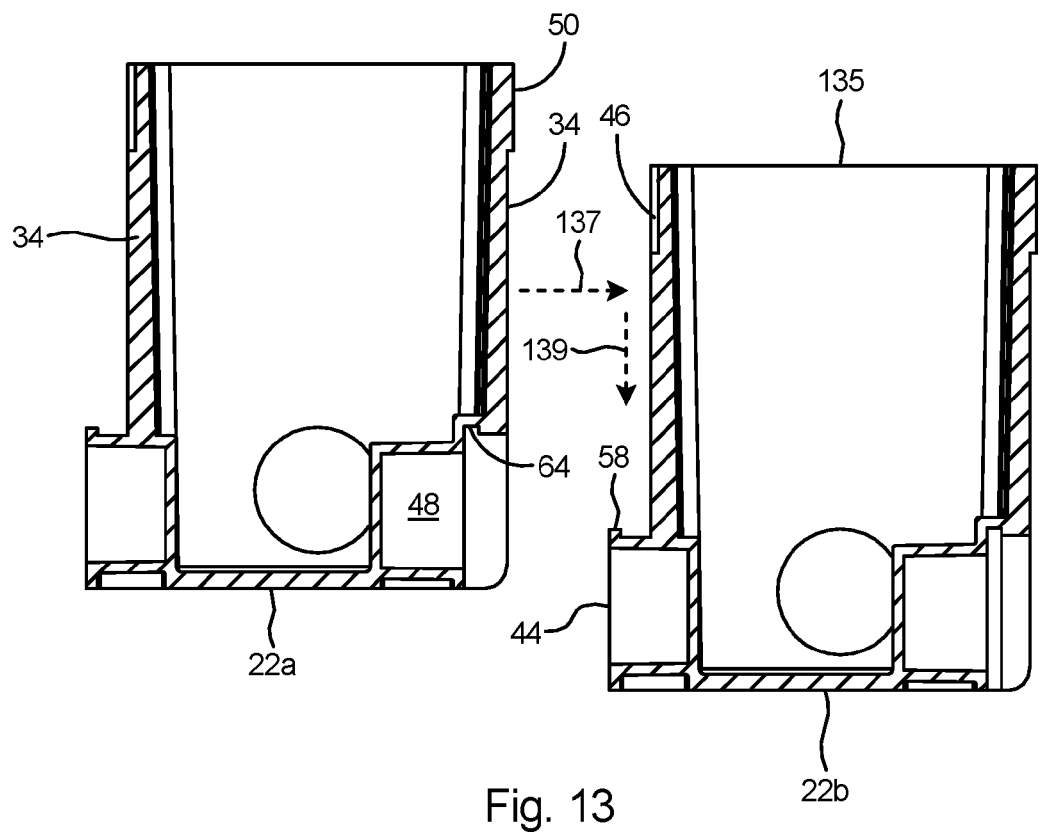
FIG. 13 is a conceptual view depicting the method of joining two electrical boxes being together to form a two-gang box.
Figure 14:
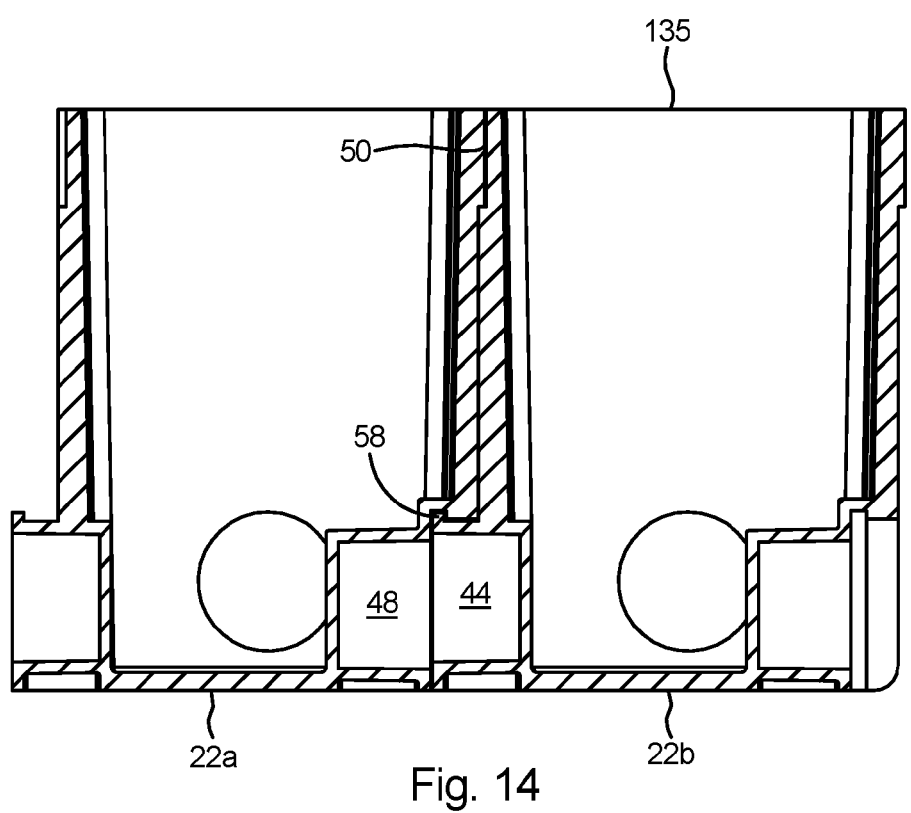
FIG. 14 is a sectional view of the two electrical boxes of FIG. 13 after being joined together to form a two-gang box.

With reference to FIGS. 13 and 14, to operate the invention a first electrical box 22a is raised a sufficient distance with respect to a second electrical box 22b so that tab 50 is over the rim 135 of the second electrical box 22b. The electrical boxes are pushed together, in the direction of arrow 137, until the side walls 34 are in contact. First electrical box 22a is then pushed downwards, along arrow 139, until tab 50 of first box engages slot 46 of second box in a dovetail fit. As the first box is slid downward along the side wall 34 of second box 22b, the flange 58 of male hub 44 on second box 22b engages and slides into slot 64 of female hub 48 in first box 22a. In this manner, two or more electrical boxes can be interlocked together to form a two-gang, three-gang, or even larger interlocking floor box to house multiple electrical components, each in their own electrical enclosure to insure a safe and reliable installation. Each adjacent box will be interlocked at both the top and bottom of the electrical boxes including dovetail engagement of tab 50 in slot 46 at the top of the adjacent boxes and engagement of flange 58 in slot 64 at the bottom of each adjacent box.

Figure 15:
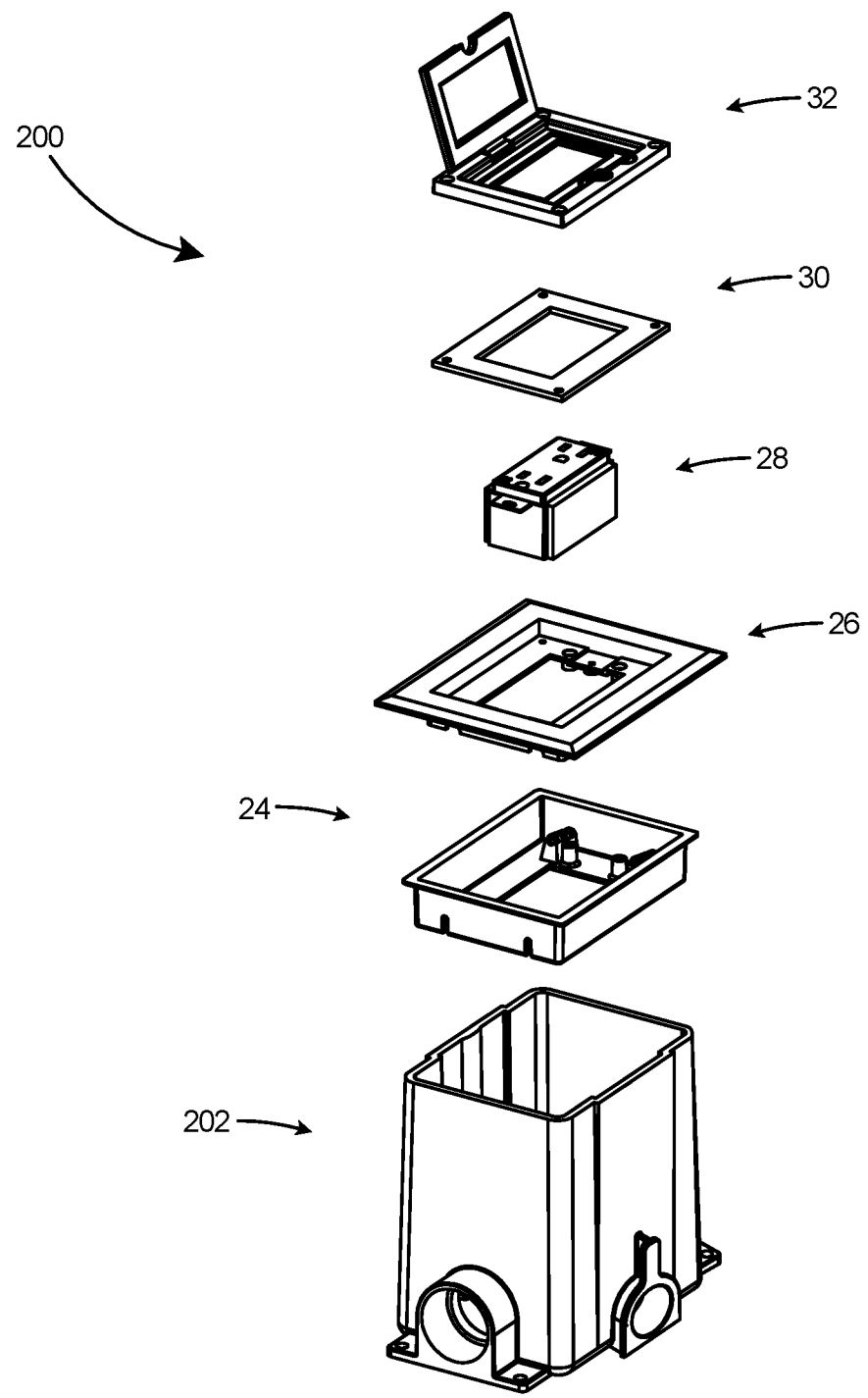
FIG. 15 is an exploded isometric view of a second of an interlocking floor box assembly in accordance with embodiments of the invention.
Figure 16:
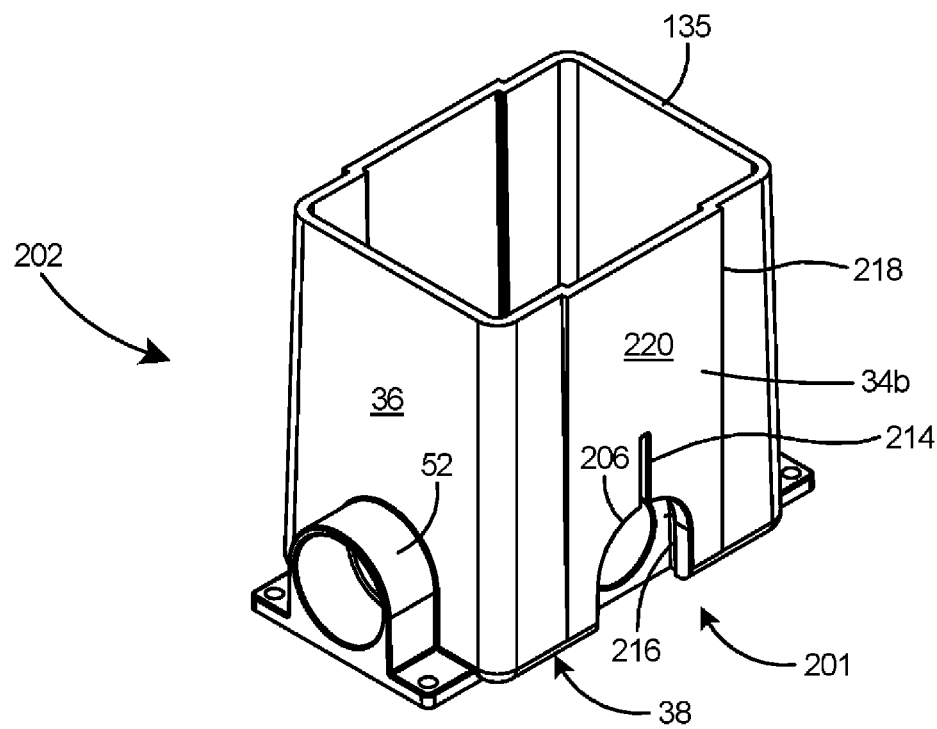
FIG. 16 is a top isometric view of an electrical box that forms a portion of the interlocking floor box of FIG. 15.
Figure 17:
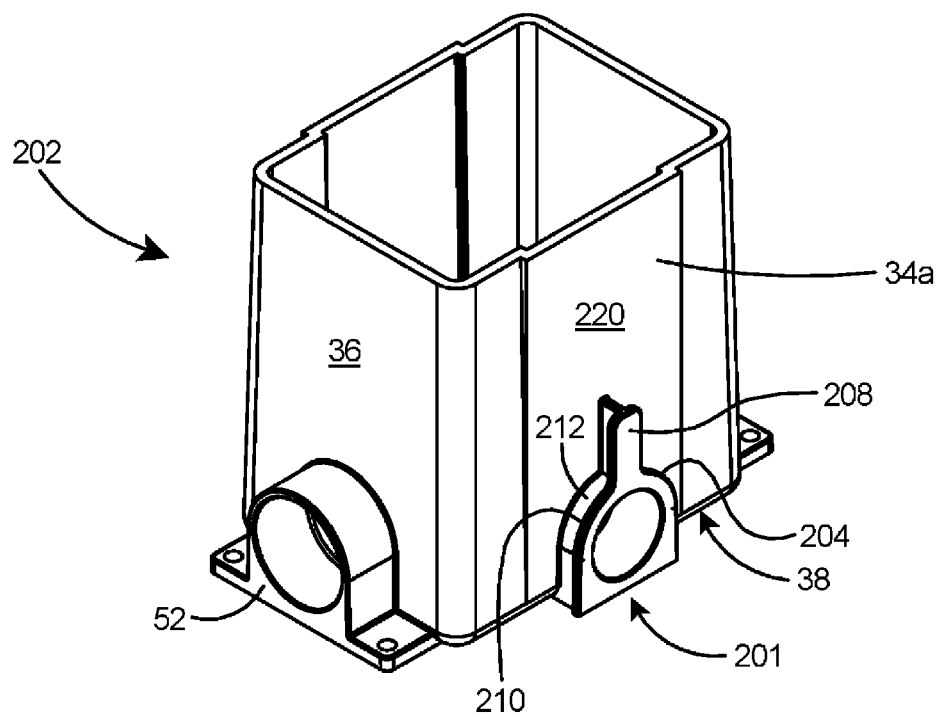
FIG. 17 is a top isometric view of the electrical box, with the box rotated 180 degrees from that shown in FIG. 16.
Figure 18:
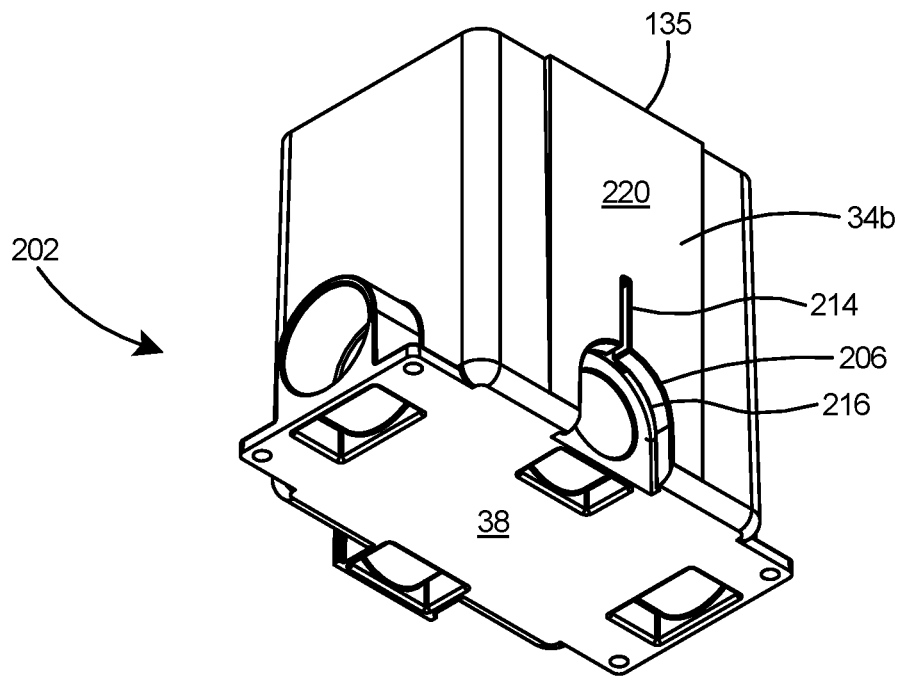
FIG. 18 is a bottom isometric view of the electrical box of FIG. 16.
Figure 19:
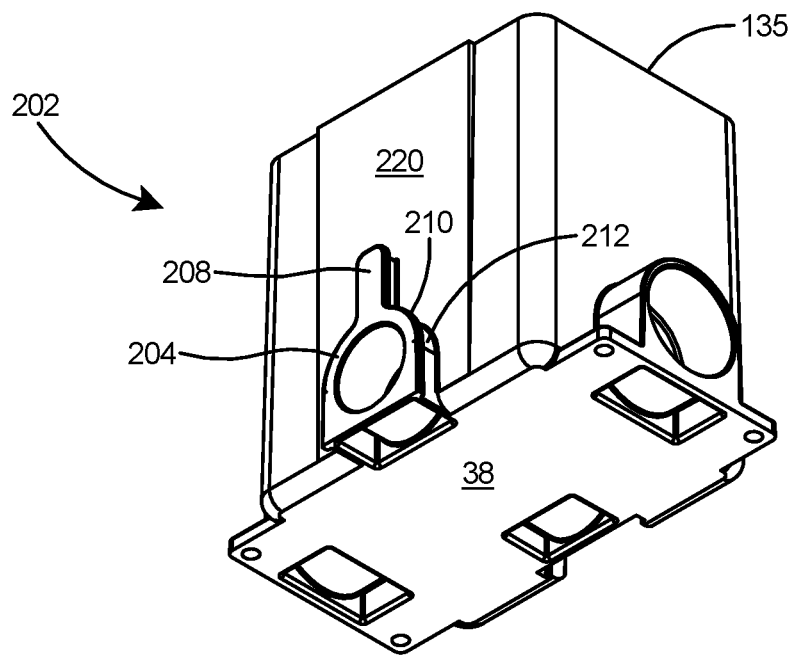
FIG. 19 is a bottom isometric view of the electrical box, with the box rotated 180 degrees from that shown in FIG. 18.

Referring to FIG. 15 there is shown a second and preferred embodiment of an interlocking floor box assembly 200 in accordance with embodiments of the invention. The interlocking floor box assembly 200 includes a second embodiment of the electrical box 202 that combines with the cover plate adapter 24, the cover plate 26, the optional gasket 30, and lid assembly 32 to mount an electrical component, such as a duplex receptacle 28, the floor of a building. The second embodiment of the electrical box 202 includes extended locking conduit hubs for ganging together two or more boxes to form an interlocked floor box.

With reference to FIGS. 16-19, a first interlocking means 201 on electrical box 202 includes a male hub 204 on a first side wall 34a and a female hub 206 on the opposing or second side wall 34b. An arm 208 extends upward along the first side wall 34a from the outer periphery of the male hub 204. A collar 210 extends around the outer periphery 212 of the male hub 204 and around the arm 208. An arm-receiving opening 214 is provided in the second sidewall 34b extending upward from the female hub 206. A collar-receiving slot 216 extends around the inner periphery of the female hub 206. A raised center portion 218 extends vertically down each of the side walls 34a and 34b, with the raised center portion being thicker at the top rim 135 than at the bottom wall 38. The outer surface 220 of the raised center portion is preferably perpendicular to the bottom wall 38. The arm 208 of the male hub 204 and arm-receiving opening 214 of the female hub 206 form the extended locking conduit hubs of the current invention.

Figure 20:
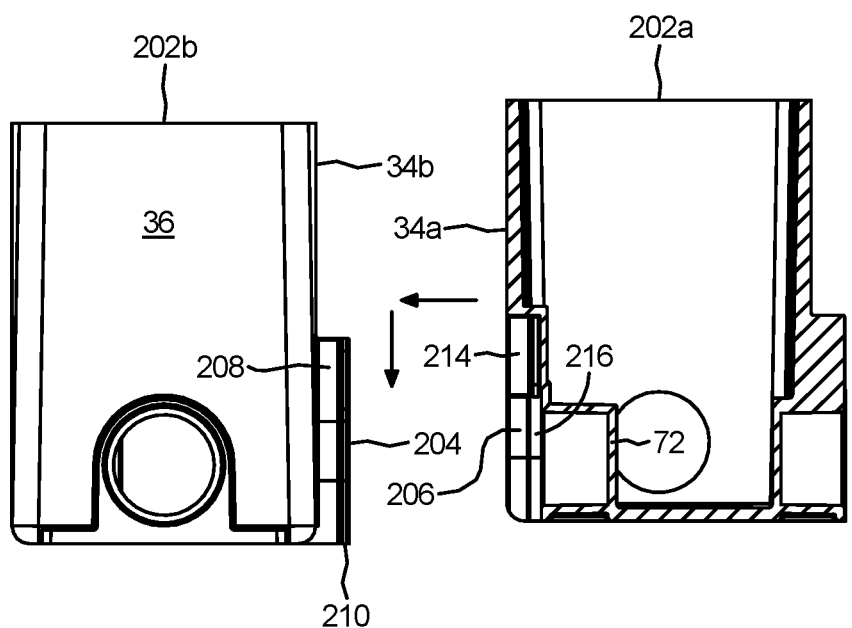
FIG. 20 is a side view of two electrical boxes being joined together to form a two-gang box, with the electrical box on the right in sectional view.
Figure 21:
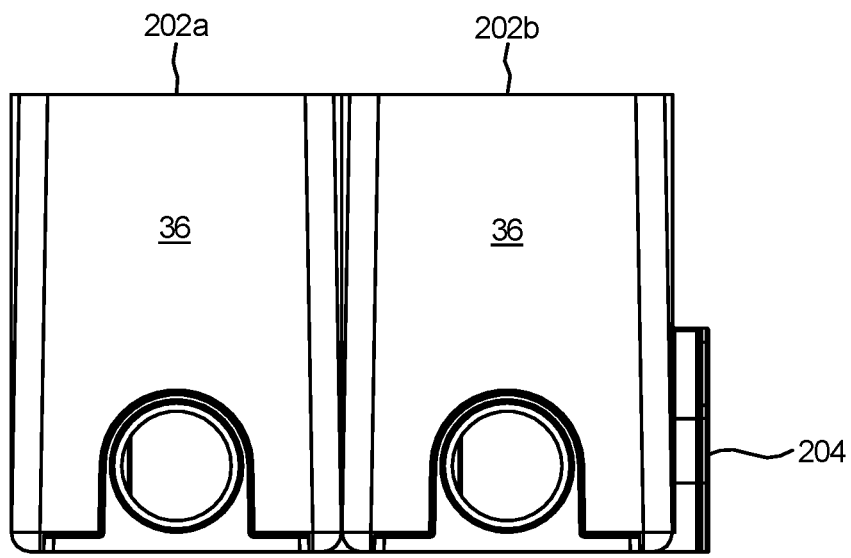
FIG. 21 is side view of the two electrical boxes of FIG. 20 joined together to form a two-gang box.
Figure 22:
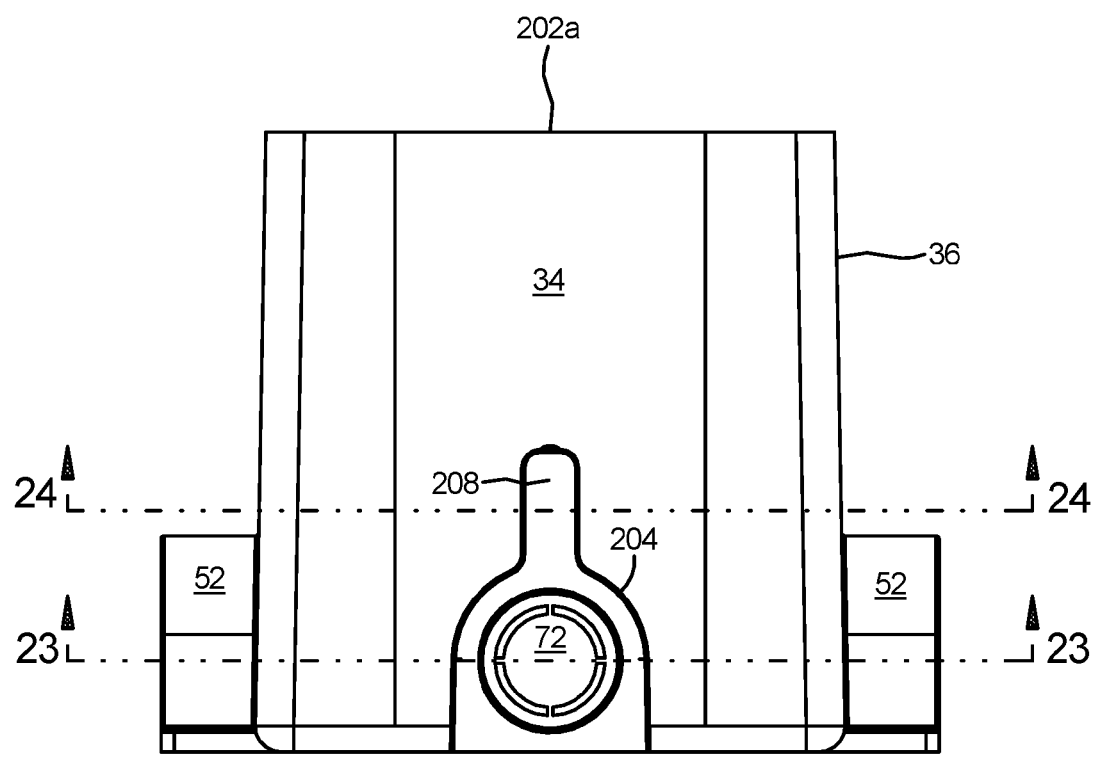
FIG. 22 is an end view of the two-gang box of FIG. 21.

Referring to FIGS. 20 and 21, two or more electrical boxes 202a and 202b may be interlocked together by sliding engagement of two boxes. With the female hub 206 and male hub 204 in alignment, sliding a first side 34a of first box 202a, including the female hub 206, downward against a second side 34b of second box 202b will interlock the male hub 204 into the female hub 206. Collar 210 of male hub 204 slides into collar-receiving slot 216 of female hub and arm 208 of male hub slides into arm-receiving opening 214 of female hub. After the two boxes 202a and 202b are slid completely together, with the bottom walls 38 planar to each other such as shown in FIG. 21, the boxes will be securely interlocked. With the breakaway wall portions 72 removed from the male and female hubs 204 and 206 electrical wiring can be passed between the enclosures of the two boxes. In the same manner, additional boxes can be interlocked with the joined boxes to form a three-gang box, four-gang box, and even larger boxes as required by the particular electrical installation.

Figure 23:
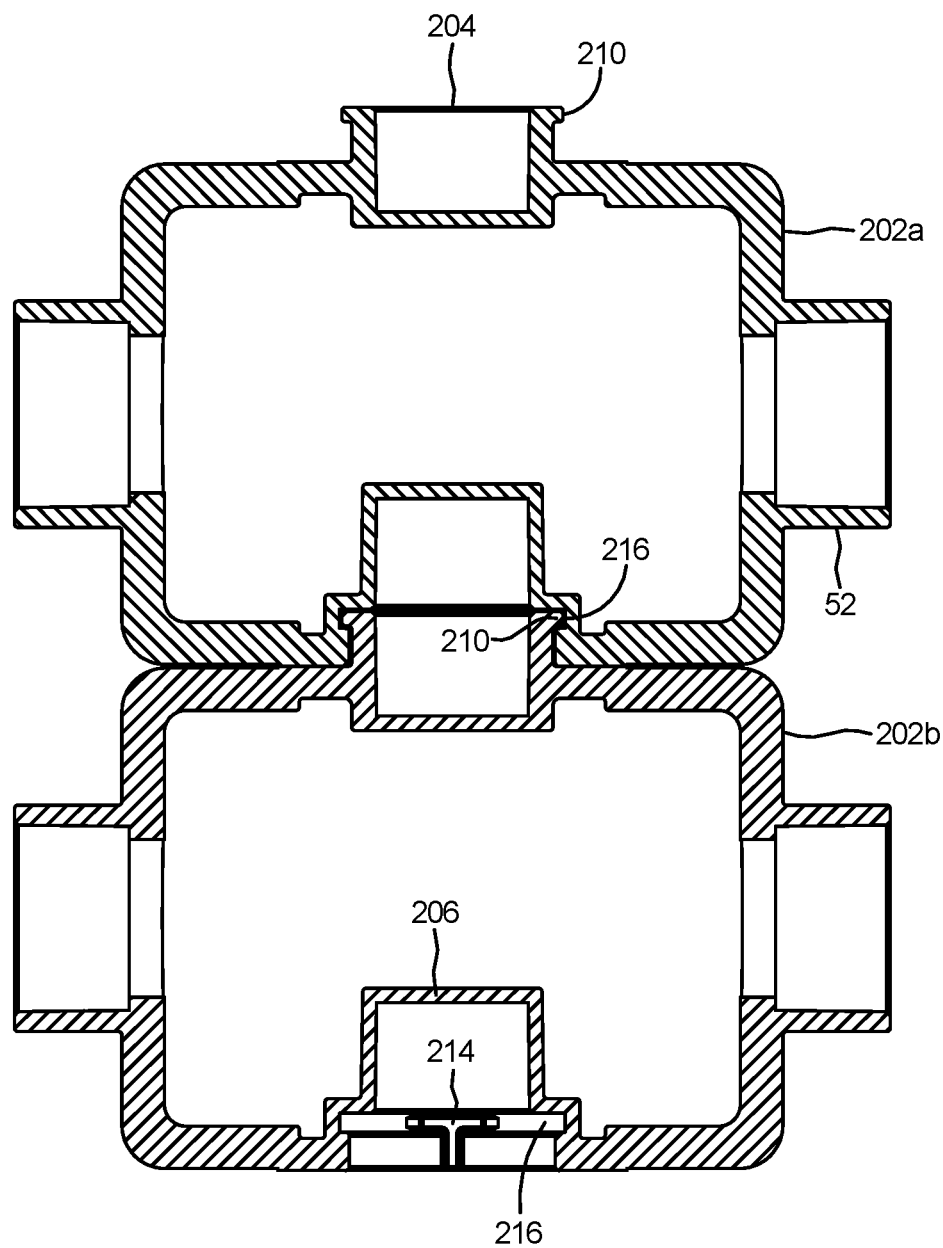
FIG. 23 is a sectional view taken along line 23-23 of FIG. 22.
Figure 24:
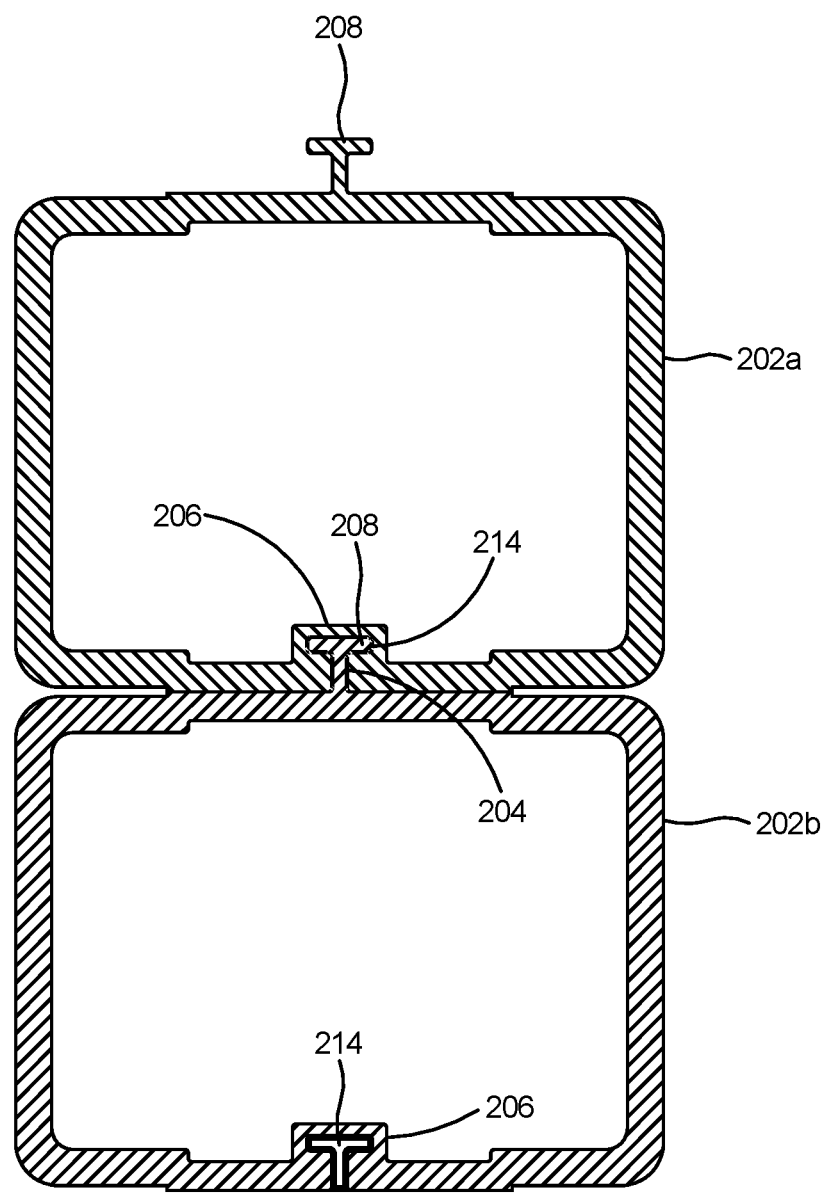
FIG. 24 is a sectional view taken along line 24-24 of FIG. 22.

As shown in FIG. 23, the lower portion of the electrical boxes 202a and 202b are interlocked with collar 210 of male hub 204 locked into collar-receiving slot 216 of female hub 206. As shown in FIG. 24, the upper portion of the electrical boxes 202a and 202b are interlocked with arm 208 of male hub 204 interlocked with arm-receiving opening 214 of female hub 206.

Figure 25:
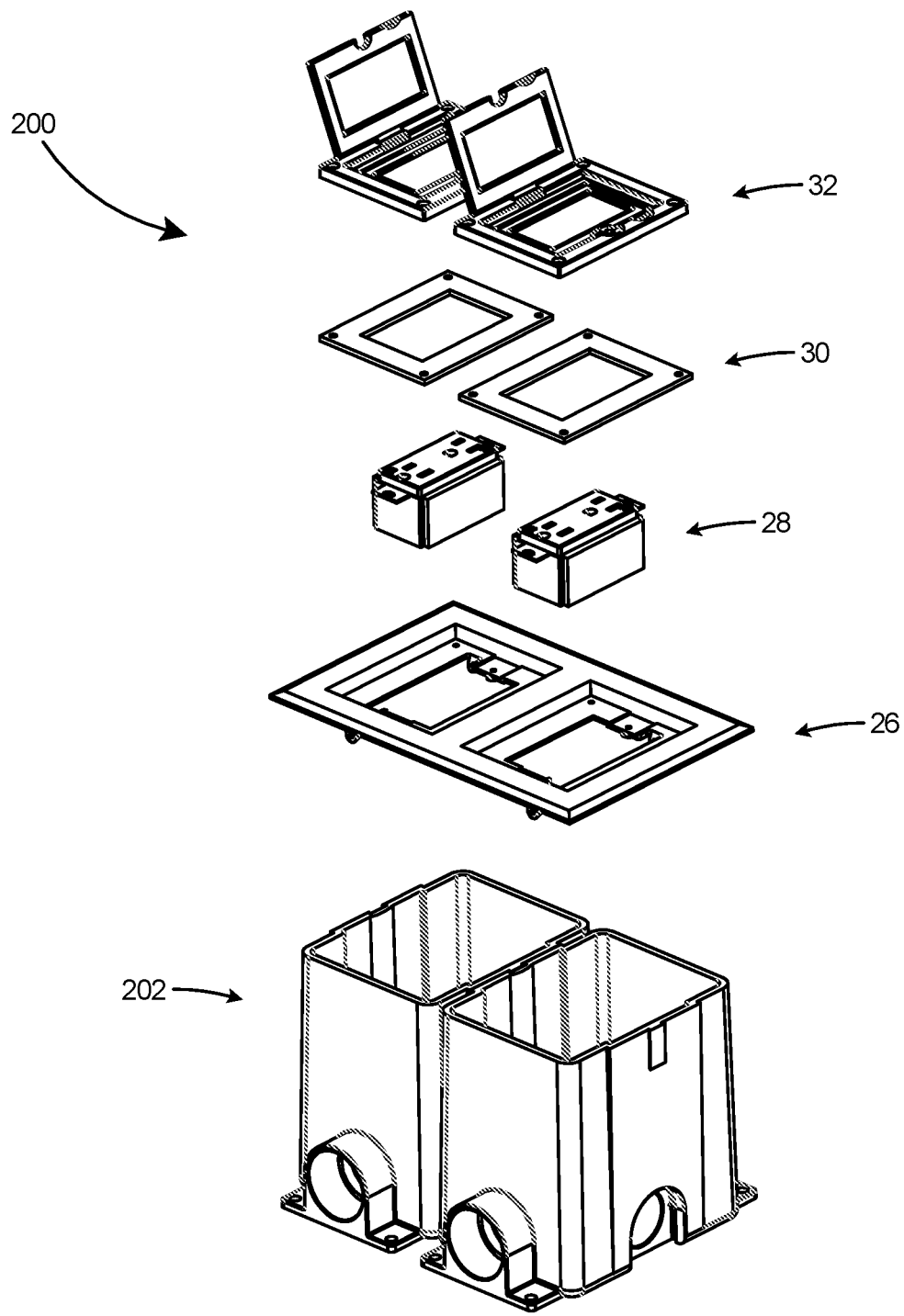
FIG. 25 is an exploded isometric view of a third and preferred embodiment of an interlocking floor box assembly in accordance with embodiments of the invention.

With reference to FIG. 25 a third and preferred embodiment of an interlocking floor box assembly 300 according to the present invention, which is depicted in a two-gang assembly, includes two electrical boxes 202, a cover plate 302, optional gaskets 30 and two lid assemblies 32. Interlocking floor box assembly 300 does not require a cover plate adapter as shown in the previous embodiments. Cover plate 302 is adapted to attach directly to the flooring secured above the electrical boxes 202 and thus eliminate the need for a cover plate adapter.

Figure 26:
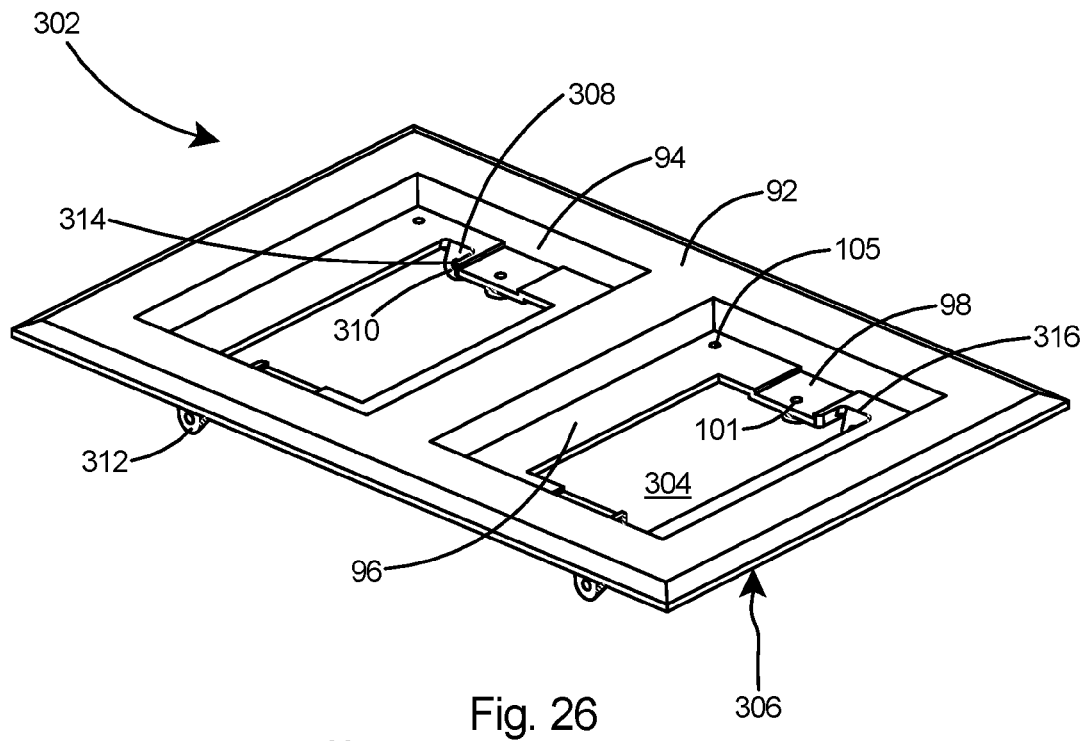
FIG. 26 is an isometric view of a cover plate that forms a portion of the interlocking floor box of FIG. 25.

As shown in FIG. 26, cover plate 302 further includes one or more openings 304, a rear surface 306 and an angled boss 308 extending from the rear surface. A bore 314 is provided in each angled boss 308. Angled boss 308 includes a front face 310 that is at an acute angle with respect to the face plate 92 and a rear face 312 that is perpendicular to the face plate 92. A notch 316 extends into the component mounting surface 96 to provide access to each angled boss.

Figure 27:
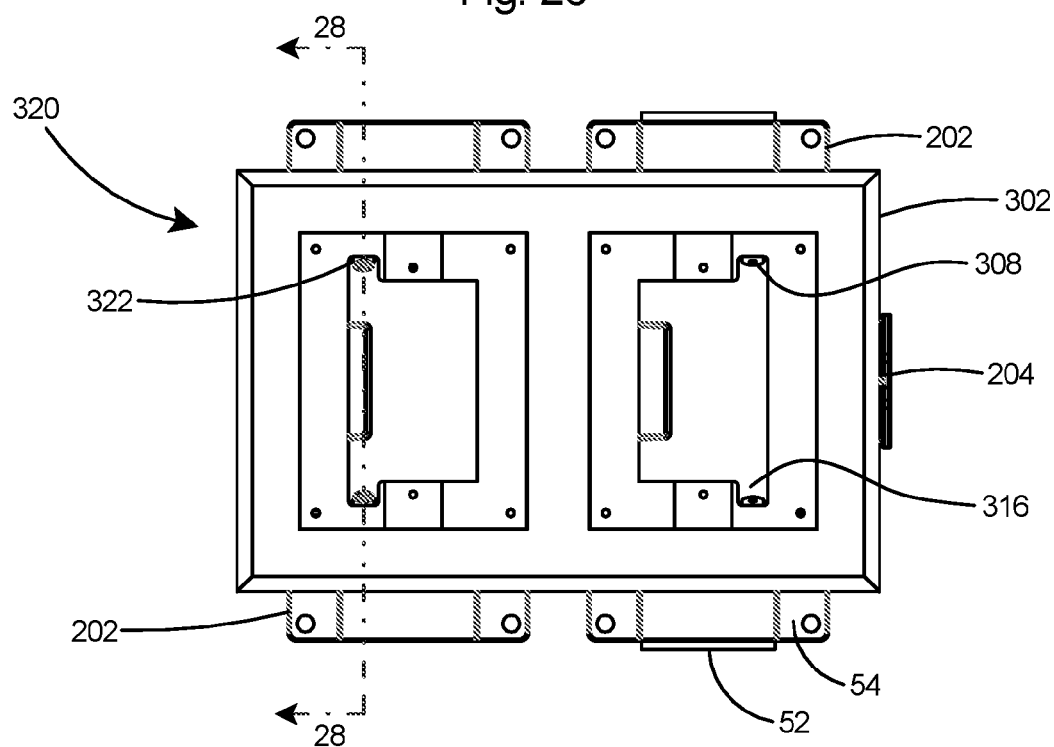
FIG. 27 is a top view of a two-gang floor box assembly constructed with two interlocking floor boxes as depicted in FIG. 25.

Referring to FIG. 27, there are shown two electrical boxes 202 interlocked together to form a two gang electrical floor box assembly 320 according to the present invention. Fasteners 322 are seated in angled bosses 308 of the cover plate 302 on the left-hand side electrical box 202 in the figure.

Figure 28:
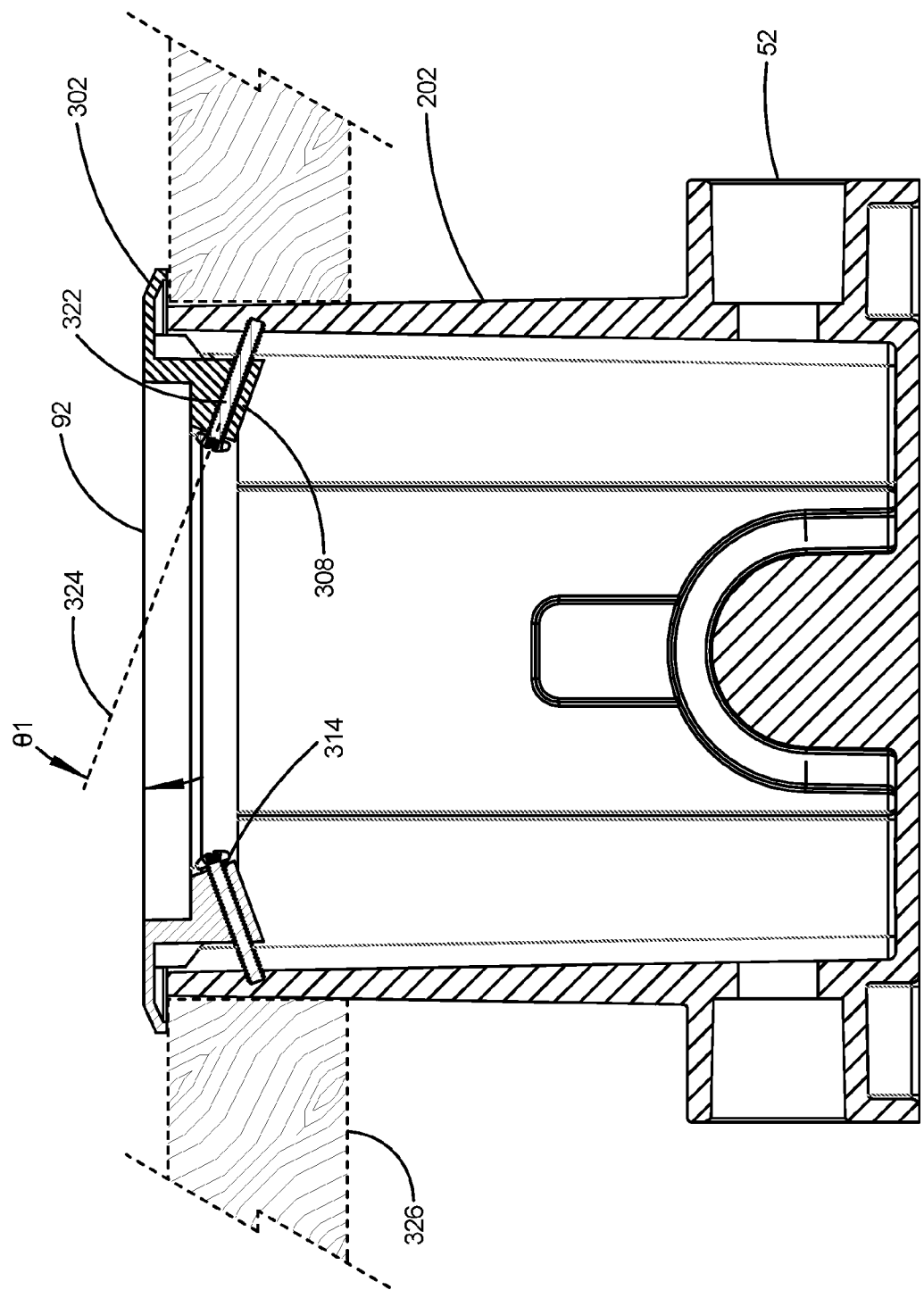
FIG. 28 is a sectional view taken along line 28-28 of FIG. 27 and depicting the two-gang floor box mounted to a floor.

With reference to FIG. 28, the bore 314 in each angled boss 308, as shown by angle and axis 324, is axially aligned at an acute angle $\theta 1$ with respect to the face plate 92 portion of the cover plate 302. When mounting to a floor 326, the fasteners 322 are driven through angled bosses 308 and into the floor. The alignment at acute angle $\theta 1$ facilitates easy access to and insertion of the fasteners 322 when securing the interlocking floor box assembly to a floor.

Most preferably the electrical box, cover plate, and cover plate adapter of the present invention are each molded in one piece of plastic. Suitable plastics may include polyvinyl chloride (PVC) and polycarbonate. The lid assembly may be constructed of metal or plastic.

To operate the invention, the electrical box is anchored in a concrete pour area, conduit is connected to the hubs, an electrical component is installed in the box and wiring connections are completed. After concrete is poured and allowed to cure, the side walls of the electrical box or boxes may be cut to the desired length. If a floor is being constructed above the concrete, such as a wood floor, the side walls may be cut to meet the lower surface of the flooring.

The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. An interlocking floor box assembly, comprising:
    a plurality of electrical boxes, each of said electrical boxes including a plurality of side walls and end walls defining an enclosure having an open top;
    a first interlocking means and a second interlocking means on said electrical boxes, said first interlocking means including a male interlocking hub on a first of said electrical boxes and a female interlocking hub on a second of said electrical boxes;
    a cover plate attached to said open top of said enclosure, said cover plate including a face plate;
    a lid assembly attached to said cover plate;
    a collar on said male interlocking hub and a collar-receiving slot on said female interlocking hub;
    an arm extending from said male interlocking hub and an arm-receiving opening extending from said female interlocking hub;
    said first interlocking means including sliding engagement of said collar on said first of said electrical boxes within said collar-receiving slot on said second of said electrical boxes; and
    said second interlocking means including sliding engagement of said arm of said first of said electrical boxes within said arm-receiving opening of said female interlocking hub on said second of said electrical boxes.

2. The interlocking floor box assembly of claim 1, further comprising an angled boss on said cover plate.

3. The interlocking floor box assembly of claim 2, further comprising a bore in said angled boss.

4. The interlocking floor box assembly of claim 3, wherein said bore in said angled boss is at an acute angle with respect to said face plate of said cover plate.

5. The interlocking floor box assembly of claim 4, further comprising:
    a rear face on said angled boss, and
    said rear face is perpendicular to said face plate of said cover plate.

6. The interlocking floor box assembly of claim 1, further comprising:
    a component mounting surface on said cover plate; and
    a notch on said component mounting surface.

7. The interlocking floor box assembly of claim 1, wherein said lid assembly further comprises:
    a mounting frame including a recessed area having an opening and a rotatable lock; and
    a lid connected to said mounting frame by a hinge, said lid closing within said recessed area of said mounting frame.

* * * * *